J. H. HALLER.
LATH HOLDER.
APPLICATION FILED JULY 14, 1916.
1,221,317.
Patented Apr. 3, 1917.
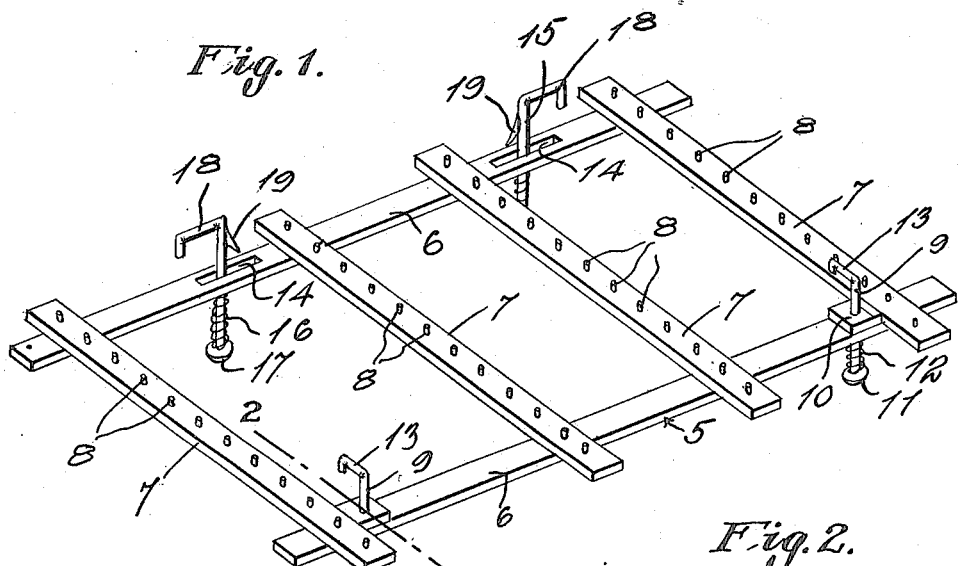
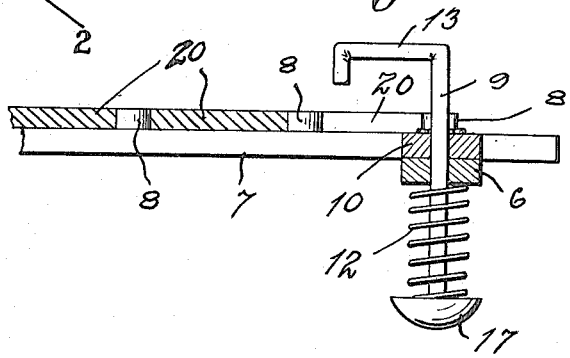
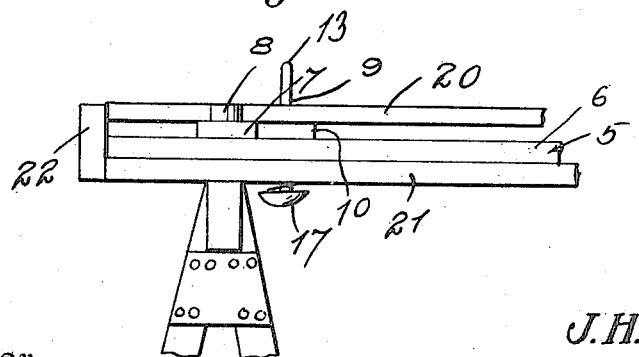
Witnesses
Inventor
J. H. Haller
By
Attorney

UNITED STATES PATENT OFFICE.

JOHN H. HALLER, OF BUCKLIN, KANSAS.

LATH-HOLDER.

1,221,317.  Specification of Letters Patent.  Patented Apr. 3, 1917.

Application filed July 14, 1916. Serial No. 109,310.

*To all whom it may concern:*

Be it known that I, JOHN H. HALLER, a citizen of the United States, residing at Bucklin, in the county of Ford and State of Kansas, have invented certain new and useful Improvements in Lath-Holders; and I do hereby declare the following to be a full, clear, and exact description of the invention, such as will enable others skilled in the art to which it appertains to make and use the same.

This invention has for its object to provide a simple and efficient lath holder, whereby the operation of properly spacing and holding the laths in position against the studding of a wall or ceiling is expedited.

Another object is the provision of means for securing the lath holder in position upon the studs while the laths are being nailed or otherwise secured in position.

With these and other objects in view, the invention consists in the novel construction, combination and arrangement of parts as will be hereinafter specifically described, claimed and illustrated in the accompanying drawing, in which:

Figure 1 represents a perspective view of the improved lath holder,

Fig. 2 represents a sectional view on the line 2—2 of Fig. 1, showing several laths in position, Fig. 3 represents a fragmentary side elevation of the improved lath holder, showing the support therefor.

Referrring to the drawing in detail, wherein similar reference numerals designate corresponding parts throughout the several views, the numeral 5 indicates generally the frame of the improved lath holder which includes the two spaced parallel side or longitudinal members 6, and the transverse connecting members 7, which are secured adjacent their opposite ends to the longitudinal members 6, and are provided with rows of uniformly spaced spacing pins 8, between which the laths are positioned and retained in uniformly spaced relation. Lath-engaging hooks 9 are slidably mounted in blocks 10 secured adjacent the ends of one of the longitudinal members 6, and are provided at their lower terminals with heads constituting handles 11. Springs 12 are interposed between the heads 11 and the longitudinal members 6 and normally tend to draw the beaks or angular terminals 13 of the hooks toward the longitudinal member 6. The hooks 9 are adapted to engage a lath already placed in position on the studding, so as to position the laths carried by the frame 5 in correct relation to the lath already placed in position.

The opposite longitudinal member 6 is formed with a pair of elongated slots 14, in which are slidably mounted the shanks of a pair of stud-engaging hooks 15, which are normally retained in position adjacent the longitudinal member 6 by the tension of springs 16 confined between the member 6 and the heads 17. The beaks, or angular terminals 18 of the hooks 15 are of such size as to embrace a stud and are provided with laterally projecting teeth 19, adapted for insertion in a stud to secure one side of the frame in position thereon when it is impossible to apply the hooks 18 to the studding.

In placing the laths 20 in position upon the holder 5 the latter is preferably supported upon a table 21, having an upstanding flange 22 at one end against which the ends of the laths may be moved to insure proper alinement thereof. The spacing pins 8 insure uniform spacing of the several laths supported upon the holder, and the latter is supported in position by engaging the hooks 13 with the laths which have already been secured in position, and subsequently engaging the hooks 18 with the studding of the building structure. Should the studding be of such size as to prohibit the use of hooks 18, the teeth 19 may be inserted in the studs and the side of the holder frame supported in position. After the holder frame has been secured in the desired position upon the studding the several laths may be conveniently nailed or otherwise secured in position.

What I claim is:

1. A lath holder comprising a frame including longitudinal members and transverse connecting members, a plurality of pins carried by said transverse connecting members, lath-engaging hooks carried by one of the longitudinal members, means normally tending to move the beak or angular end of said hooks toward said longitudinal member, spring actuated hooks carried by the other longitudinal member adapted to engage the studding of a building structure to secure the frame in position thereon, and laterally projecting teeth carried by the last-mentioned hooks.

2. A lath holder comprising a frame including longitudinal members and transverse connecting members, a plurality of pins carried by said transverse connecting members, lath engaging hooks carried by one of the longitudinal members, means normally tending to move the beak or angular end of said hooks toward said longitudinal member, spring actuated hooks carried by the other longitudinal member adapted to engage the studding of a building structure to secure the frame in position thereon, said spring actuated hooks being adjustably carried by said longitudinal member, as and for the purpose specified.

In testimony whereof I affix my signature in presence of two witnesses.

JOHN H. HALLER.

Witnesses:
E. S. GORDON,
H. M. THOMPSON.

Copies of this patent may be obtained for five cents each, by addressing the "Commissioner of Patents, Washington, D. C."